(12) United States Patent
Liverato et al.

(10) Patent No.: US 11,434,957 B2
(45) Date of Patent: Sep. 6, 2022

(54) METHOD FOR CENTERING THE MAGNETIC CENTER OF AN IMPULSE RING OF A BEARING UNIT ON THE CENTER OF ROTATION OF THE BEARING UNIT

(71) Applicant: Aktiebolaget SKF, Gothenburg (SE)

(72) Inventors: Yves-André Liverato, Saint Paterne Racan (FR); Olivier Verbe, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/235,256

(22) Filed: Apr. 20, 2021

(65) Prior Publication Data

US 2021/0364042 A1 Nov. 25, 2021

(30) Foreign Application Priority Data

May 25, 2020 (DE) .......................... 102020206482.2

(51) Int. Cl.
*F16C 19/06* (2006.01)
*F16C 41/00* (2006.01)
*G01P 3/44* (2006.01)
*F16C 33/58* (2006.01)

(52) U.S. Cl.
CPC ............ *F16C 41/007* (2013.01); *F16C 19/06* (2013.01); *F16C 33/58* (2013.01); *G01P 3/443* (2013.01)

(58) Field of Classification Search
CPC ........ F16C 19/06; F16C 33/58; F16C 33/586; F16C 41/007; G01P 3/443
See application file for complete search history.

(56) References Cited

U.S. PATENT DOCUMENTS

| 9,234,908 B2 * | 1/2016 | Shibata .................... G01P 3/443 |
| 2018/0128320 A1 | 5/2018 | Chaussat et al. |
| 2021/0164767 A1 | 6/2021 | Blokland et al. |

FOREIGN PATENT DOCUMENTS

| CN | 100436847 C | * | 11/2008 | .............. F16C 33/76 |
| JP | 2003035717 A | * | 2/2003 | ............. F16C 33/723 |
| JP | 2010164112 A | * | 7/2010 | ............. F16C 41/007 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A method for centering an impulse ring of a bearing unit on the center of rotation of the bearing unit including a first ring and a second ring. The impulse ring provided with a target having pairs of magnetic poles, and with a fixing sleeve. The method provides a) inserting the impulse ring between the first ring and the fixing sleeve, the first ring and the fixing sleeve being configured to maintain the impulse ring in an axial direction of the bearing; b) recording an angular signal over one mechanical turn of the impulse ring, the angular signal being generated by detection configured to cooperate with the pairs of magnetic poles; c) determining a total pitch deviation vector of the impulse ring based on the angular signal; d) shifting the impulse ring in a radial direction of the bearing, and e) securing the impulse ring relative to the first ring.

10 Claims, 6 Drawing Sheets

METHOD FOR CENTERING THE MAGNETIC CENTER OF AN IMPULSE RING OF A BEARING UNIT ON THE CENTER OF ROTATION OF THE BEARING UNIT

CROSS-REFERENCE TO RELATED APPLICATIONS

This application claims priority to German Patent Application no. 102020206482.2, filed May 25, 2020, the contents of which is fully incorporated herein by reference.

TECHNICAL FIELD OF THE INVENTION

The present invention relates to magnetic sensors comprising bearing units cooperating with detection means, and more particularly to methods for centering impulse rings of such bearing units.

BACKGROUND OF THE INVENTION

Magnetic sensors deliver analogue sine shaped signals related to the rotor angular position. More precisely, such a sensor comprises a rotor formed out of an impulse ring fitted with magnetic poles and a stator fitted with detection means, able to detect the magnetic field of each magnetic pole.

When rotation is applied to the rotor, the magnetic poles pass successively in front of the detections means. A current is induced within the detections means based on its distance to the magnetic poles. The current forms a periodic signal, sine shaped, function of time, wherein the intensity of the signal depends on the distance between the detections means and the magnetic poles. The time dependency can be converted into an angular dependency based on the known geometry of the sensor and the rotation speed. It is therefore possible to link time with angular position of the rotor and to obtain a sine signal linking intensity with angular position.

Such magnetic sensors are commonly used in motor control. In the particular case of belt starter generators, the requirement on sensor output signals accuracy is more and more important, due to the fact that the machine torque needs to be properly controlled with the least amount of noises. Moreover, the level of oscillating current of the battery must remain under a fixed limit in order to not degrade the overall performances of the vehicle.

One of the sources of sensor output inaccuracy is the impulse ring itself as it does not give a perfect image of the rotor position.

Due to misalignment of the different components of the bearing unit, the impulse ring is not perfectly aligned with the detections means so that the induced current is not an accurate picture of the angular position. The magnetic center of the impulse ring and the mechanical center of the rotor do not coincide.

One commonly used solution to reduce the misalignment of the different components is to improve the accuracy of the manufacturing operations in order to produce more accurate components.

However, improving manufacturing operations generally involves to extend manufacturing operation cycle times and to increase costs of production.

There is a need to avoid at least some of the previously-mentioned drawbacks, especially by reducing the misalignment of the impulse ring in the bearing unit without improving the accuracy of the bearing unit components.

SUMMARY OF THE INVENTION

According to an aspect, a method for centering the magnetic center of an impulse ring of a bearing unit on the center of rotation of a bearing of the bearing unit comprising a first ring and a second ring capable of rotating concentrically relative to one another is proposed.

The impulse ring is provided with a target comprising pairs of magnetic poles and with a fixing sleeve fixed to the first ring of the bearing, the method comprises:

a) inserting the impulse ring axially between the first ring and the fixing sleeve, the first ring and the fixing sleeve being configured to maintain the impulse ring in an axial direction of the bearing; a radial gap remaining between the impulse ring and the fixing sleeve, b) recording an angular signal over one mechanical turn of the impulse ring, the angular signal being generated by detections means configured to cooperate with the pairs of magnetic poles;

c) determining a total pitch deviation vector of the impulse ring based on the angular signal;

d) shifting the impulse ring in a radial direction of the bearing, the amplitude of the shifting and the direction of the shifting being determined from the total pitch deviation vector; and e) securing the impulse ring relative to the first ring.

Advantageously, determining a total pitch deviation vector of the impulse ring comprises:

determining a single pitch deviation value for each interval defined as the angular distance between two nearest magnetic poles of the same polarity;

selecting the maximal single pitch deviation value and the minimal single pitch deviation value;

determining a first single pitch deviation vector associated to the maximal single pitch deviation value and a second single pitch deviation vector associated to the minimal single pitch deviation value; and calculating the vector difference between the first and the second vectors, the total pitch deviation vector being equal to the resulting vector.

Preferably, determining the single pitch deviation value for one interval comprises:

determining the actual period of the angular signal measured by the detections means over the interval;

determining the period of the angular signal over the interval; and calculating the single pitch deviation as the difference between theoretical period of the angular signal and the actual period of the angular signal as a percentage of theoretical period of the angular signal.

Advantageously, the determination of the amplitude and the direction of the shifting comprises determining a relation linking the amplitude of the shifting to the module of the total pitch deviation vector, calculating the amplitude with the relation, the direction of the shifting being the opposite direction of the total pitch deviation vector.

Preferably, the relation linking the amplitude of the shifting to the module of the total pitch deviation vector is determined mathematically or empirically.

Advantageously, the which steps a), b), c) and d) are executed; steps b) and c) are repeated to determine a new total pitch deviation vector; and step e) is executed if the module of the new total pitch vector is inferior or equal to a threshold.

Preferably, the steps a), b), c) and d) are executed; steps b) and c) are repeated to determine a new total pitch deviation vector; step d) is repeated if the module of the new total pitch vector is superior to a threshold, the amplitude of the shifting and the direction of the shifting being determined from the new total pitch deviation vector; and step e) is executed when the module of the new total pitch vector is inferior or equal to a threshold.

Advantageously, the impulse ring is secured by welding, gluing or clinching.

Preferably, the fixing sleeve is fixed to the inner ring of the bearing.

According to another aspect, a bearing unit is manufactured according to a method as defined above.

BRIEF DESCRIPTION OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
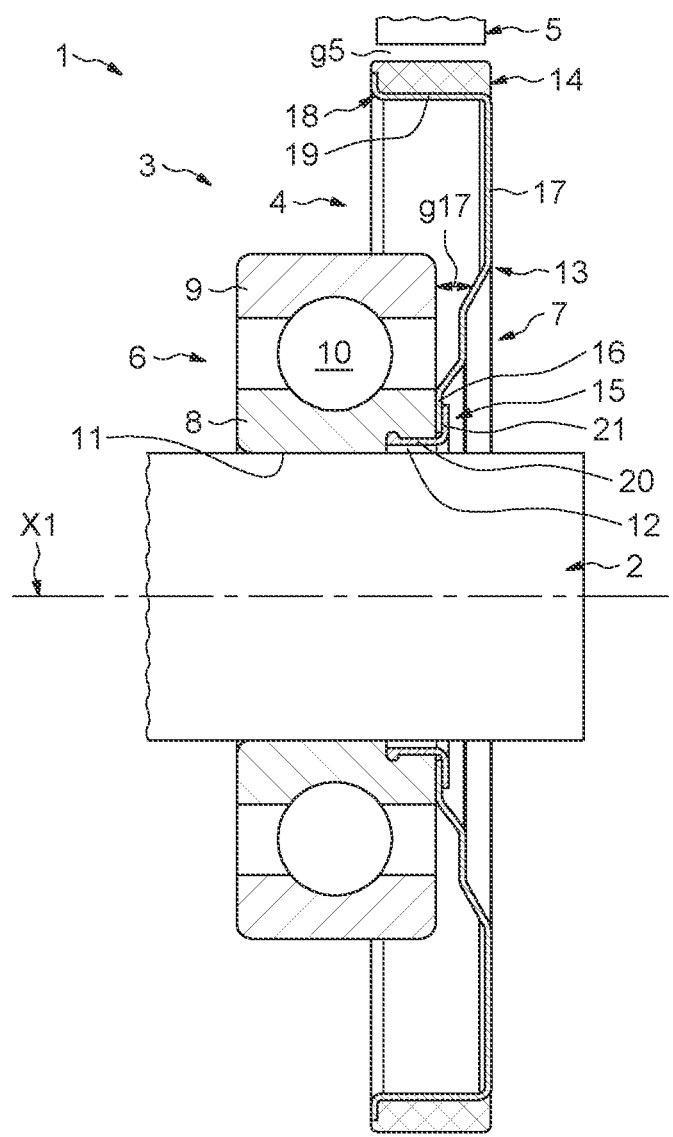
FIG. 1 is an axial section view of a bearing unit according to an example of the invention mounted on a rotating shaft.

Reference is made to FIG. 1 which represents a longitudinal section of an apparatus 1 comprises a rotating shaft 2, a bearing unit 4 and detection means 5.

The detection means comprises for example a coil.

The shaft 2 and the bearing unit 4 are centred on a central axis X1 of the apparatus 1.

The bearing unit 4 comprises a bearing 6 mounted on the shaft 2 and a magnetic impulse ring 7 mounted on the bearing 6.

The detection means 5 are associated with the impulse ring 7 for tracking the rotation of the rotating shaft 2.

The bearing 6 includes a rotating inner ring 8 and a non-rotating outer ring 9 centered on axis X1. Bearing 6 also comprises rolling elements 10, for example balls, located between inner ring 8 and outer ring 9.

The inner ring 8 comprises a cylindrical bore 11 and a cylindrical groove 12 made in the bore 11. With reference to axis X1, diameter of the cylindrical bore 11 is smaller than the diameter of the cylindrical groove 12.

The impulse ring 7 includes a target holder 13, a target 14 and a fixing sleeve 15.

Going away from central axis X1, the target holder 13 comprises an inner periphery 16, a radial portion 17 and an outer periphery 18. The inner periphery 16 defines an inner bore of the target holder 13, and is fixed to the rotating inner ring 8 of the bearing 6 by means of the fixing sleeve 15. The radial portion 17 substantially radially extends from the inner periphery 16 towards the exterior of the bearing 6. The outer periphery 18 of the radial portion 17 is located radially beyond the outer ring 9.

A gap g17 is provided axially between the radial portion 17 of the target holder 13 and the lateral face of the outer ring 9.

The outer periphery 18 of the target holder 13 comprises an outer tubular portion 19 that axially extends from the radial portion 17. The outer tubular portion 19 extends parallel to axis X1 and is located radially above the outer ring 9 of bearing 6.

Target 14 is held by the outer tubular portion 19 of the target holder 13, beyond outer ring 9 radially to axis X1.

The target 14 and the detection means 5 cooperate for tracking the rotation of the impulse ring 7, the target holder 13, the inner ring 6 and the shaft 2 around central axis X1. A gap g5 is provided radially between surface and detection means 5.

The target 14 comprises a succession of magnetic poles of opposed polarity such that the detection means 5 induce a current when the magnetic poles pass successively in front of the detections means.

As another alternative, the detection means 5 and the impulse ring 7 may use any other suitable technology instead of magnetic technology. For example, induction technology or optic technology may be implemented within the bearing unit 4 of apparatus 1.

The inner periphery 16 of the target holder 13 is fixed to the rotating inner ring 9 of the bearing 6 by means of the fixing sleeve 15.

The fixing sleeve 15 comprises an annular tubular portion 20 that axially extends parallel to axis X1.

The tubular portion 20 is fitted in the groove 12 of the rotating inner ring 8.

The fixing sleeve 15 further comprises a radial collar 21 that radially outwardly extends from an end of the annular tubular portion 20.

The radial collar 21 is overlapping the inner periphery 16 of radial extension of the target holder 13. The inner periphery 16 is axially pressed by the radial collar 21 onto the lateral face of inner ring 8 so as to prevent any relative rotation between the fixing sleeve 15, the target holder 13 and the inner ring 8.

Figure 2:
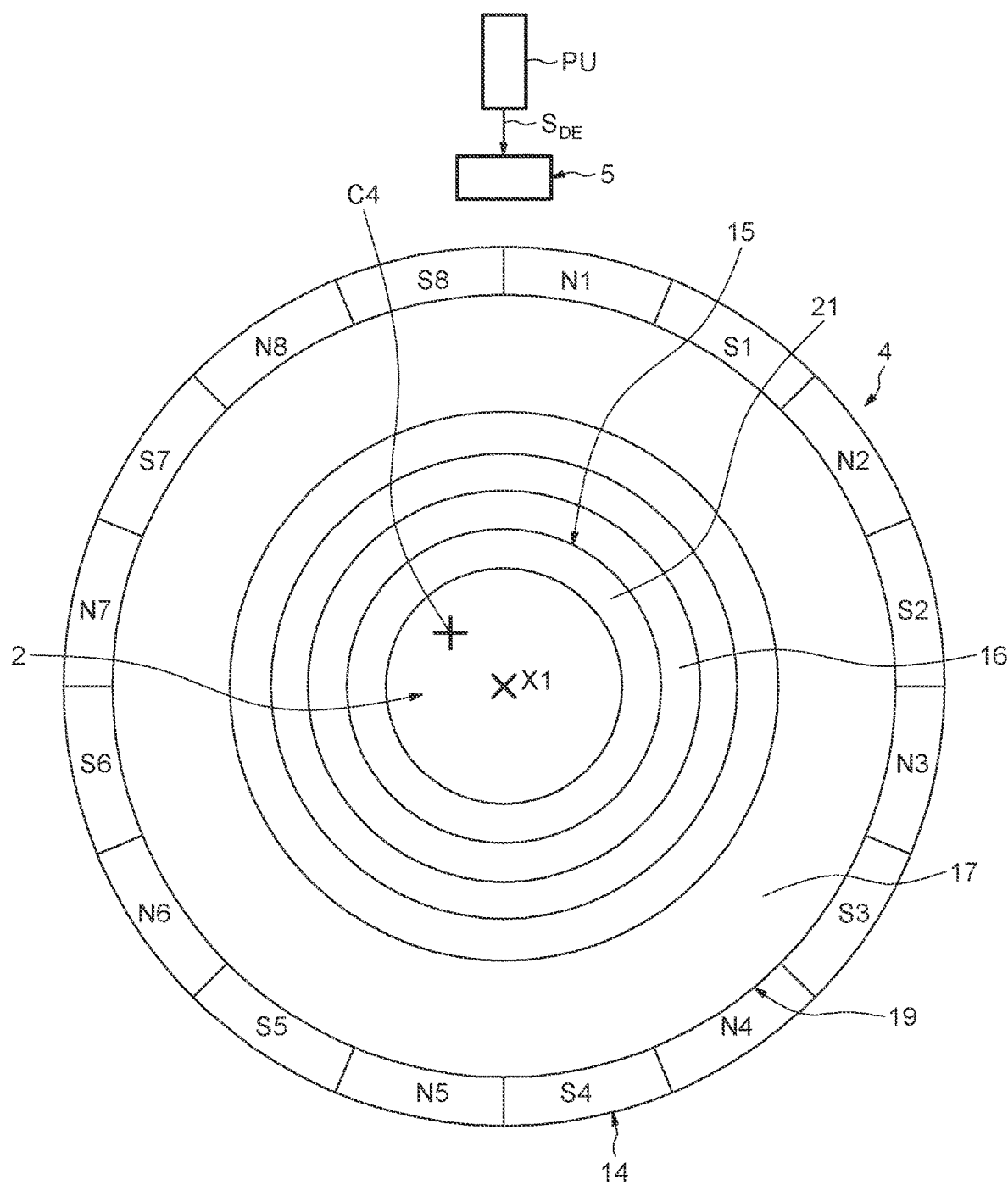
FIG. 2 illustrates schematically an embodiment of an impulse ring.

FIG. 2 represents schematically an example of an embodiment of the impulse ring 7 mounted on the shaft 2 and the detection means 5.

The target 14 comprises for example 8 north magnetic poles named N1 to N8 alternating with 8 south magnetic poles named S1 to S8 forming 8 pair of poles denoted $N_{pp}$.

In another embodiment, the impulse ring 7 comprises more or less that 8 pair of poles.

The magnetic center of the impulse ring 7 is named C4 and does not coincident with the center of rotation of the bearing 6, the center of rotation lying on axis X1, the two centers being separated by a distance e.

The detection means 5 generate an angular signal $S_{DE}$ comprising the induced current $I_{induced}$ over one mechanical turn of the impulse ring 7.

An interval i is defined as the angular distance between two nearest poles $N_i$, $S_i$ of same polarity, i varying from 1 to 8.

When rotation is applied to the rotating shaft 2, each pair of poles $S_i$, $N_i$ in front of the detections means 5 induces a current $I_{real}(i)$ such that:

$$I_{induced} = \sum_{i=1}^{8} I_{real}(i) \qquad (1)$$

The angular signal $S_{DE}$ is for example process by a processing unit PU.

Figure 3:
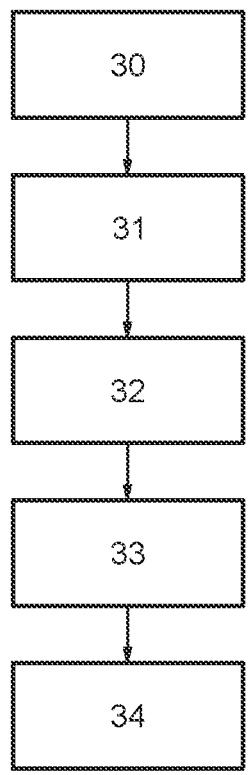
FIG. 3 illustrates a first embodiment of a method for centering the magnetic center of the impulse ring according to the invention.

FIG. 3 represents a first embodiment of a method for centering the magnetic center C4 of the impulse ring 7 on the center of rotation of the bearing 6.

In a step 30, the impulse ring 7 is inserted between the inner ring 8 and the fixing sleeve 15, the inner ring 8 and the fixing sleeve 15 being configured to maintain the impulse ring 7 in the axial direction X1 of the bearing 6.

Figure 4:
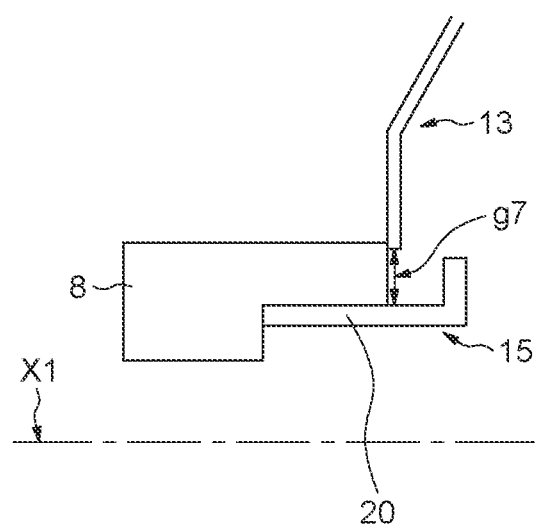
FIG. 4 illustrates the impulse ring inserted axially between the first ring and the fixing sleeve.

As represented on FIG. 4, a radial gap g7 remains between the target holder 13 of the impulse ring 7 and the fixing sleeve 15.

The radial gap g7 remains between the fixing sleeve 15 and the bore of the target holder.

Then, in a step 31, the detection means generate the angular signal $S_{DE}$ over one mechanical turn of the impulse ring 7.

In step 32, the processing unit PU determines a total pitch deviation vector $\overrightarrow{TPD}$ of the impulse ring 7 based on the angular signal $S_{DE}$.

First, a single pitch deviation value SPD for each interval i is calculated on the basis of the formula:

$$SPD(i) = \frac{P_{Theo}(i) - P_{real}(i)}{P_{Theo}} \times 100 \qquad (2)$$

wherein:
PTheo(i): Theoretical period of the angular signal for the interval i
Preal(i): Actual period of the angular signal for the interval i.

It is to be noted that the actual period Preal(i) is to be determined between poles of same sign, i.e. between North poles or between South poles. Similarly, the actual period Preal(i) is to be determined between the same kind of signal edges, i.e. between rising edges or between falling edges.

Figure 5:
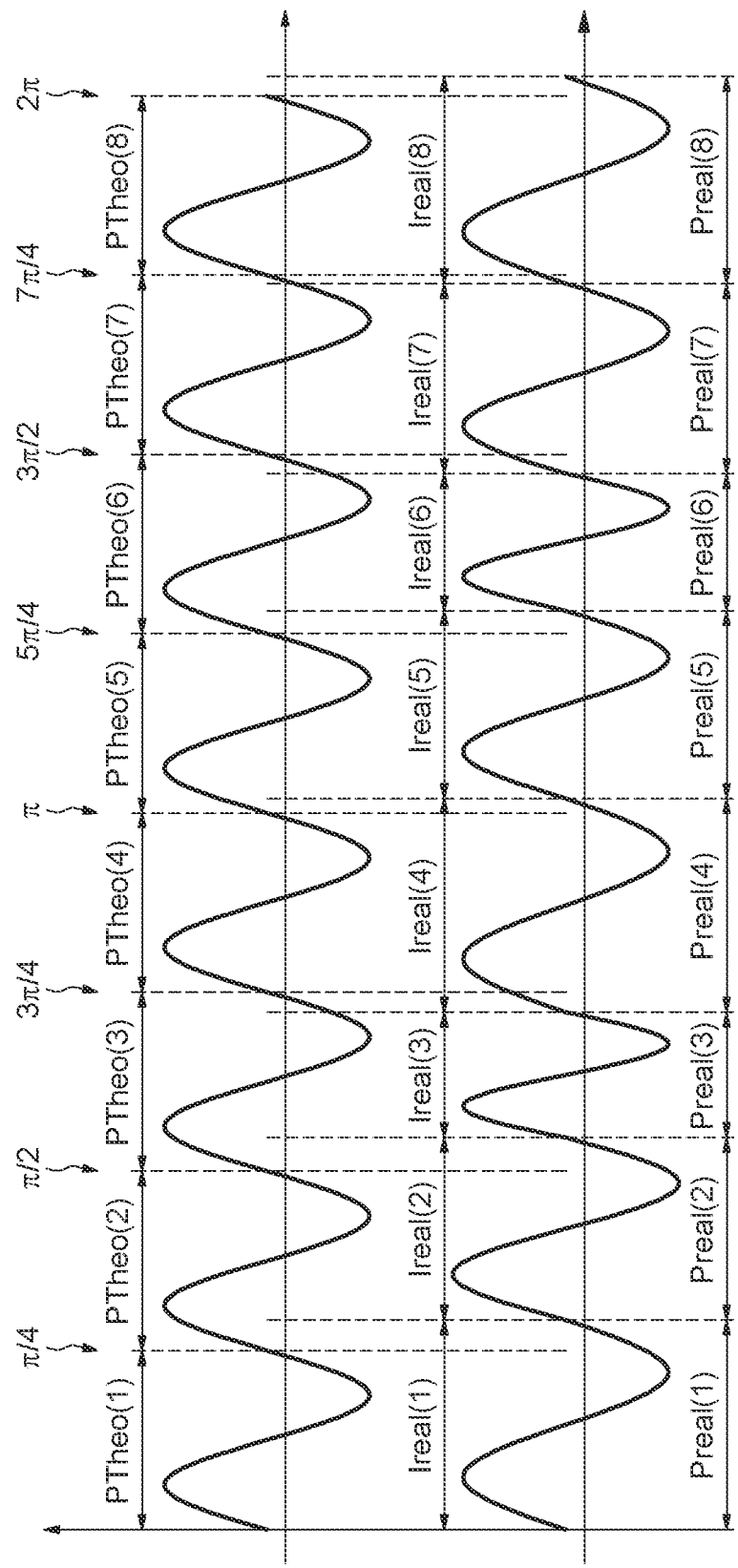
FIG. 5 illustrates an example of an angular signal.

FIG. 5 illustrates the induced current $I_{induced}$ comprising the currents $I_{real}(i)$, theoretical period PTheo(i) and the actual period Preal(i) over a mechanical turn, i varying from 1 to 8.

Then, the processing unit PU selects the maximal single pitch deviation value SPDmax and the minimal single pitch deviation value SPDmin, and determines a first single pitch deviation vector $\overrightarrow{SPDmax}$ associated to the maximal single pitch deviation value and a second single pitch deviation vector $\overrightarrow{SPDmin}$ associated to the minimal single pitch deviation value.

The module of the first single pitch deviation vector $\overrightarrow{SPDmax}$ is defined by the maximal single pitch deviation value SPDmax for example equal to 0.16% and the direction of the vector is defined by the angular position of the maximal single pitch deviation value SPDmax in the mechanical turn for example $$\frac{7}{4}\pi$$

or 315.07°.

Similarly, the module of the second single pitch deviation vector $\overrightarrow{SPDmin}$ is defined by the minimal single pitch deviation value SPDmin for example equal to −0.13% and the direction of the vector is defined by the angular position of the minimal single pitch deviation value SPDmin in the mechanical turn for example $$\frac{5}{4}\pi$$

or 135.03°.

The processing unit PU calculates the vector difference between the first and the second vectors, the pitch deviation vector $\overrightarrow{TPD}$ being equal to the resulting vector.

Using the above-mentioned values, the pitch deviation vector $\overrightarrow{TPD}$ is defined by its module TPD equal to 0.20% and by the angular position $D_{TPD}$ equal to −85.55°.

Then, in step 33 (FIG. 3), the impulse ring 7 is shifted in a radial direction of the bearing 6

The amplitude $A_{SH}$ of the shifting and the direction $D_{SH}$ of the shifting is determined from the total pitch deviation vector $\overrightarrow{TPD}$, the shifting being represented by the shifting vector $\overrightarrow{SH}$ characterized by the amplitude $A_{SH}$ and the direction $D_{SH}$ A relation named $F_{link}$ links the amplitude $A_{SH}$ of the shifting to the module of the total pitch deviation vector $\overrightarrow{TPD}$, and the direction $D_{SH}$ of the shifting is opposed to the direction of the vector $\overrightarrow{TPD}$.

The relation $F_{link}$ is determined empirically or mathematically.

Now is exposed a method to determine mathematically the relation $F_{link}$.

Figure 6:
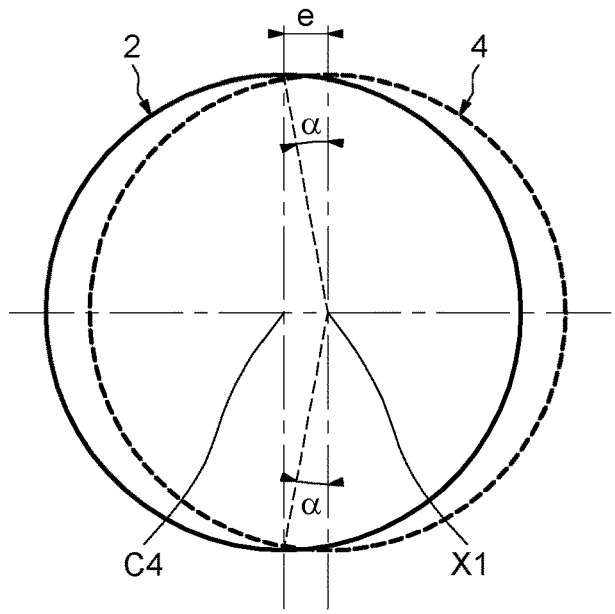
FIG. 6 illustrates schematically the magnetic center and a mechanical center shifted by a distance.

FIG. 6 illustrates schematically the magnetic center C4 and the mechanical center X1 separated by the distance e.

The circumference C1 of the impulse ring 7 is equal to the diameter D of the impulse ring 7 in front of the detection means 5 multiply by π.

One electric degree is equal to the circumference C1 divided by 360 multiply by the number of pair of magnetic poles $N_{PP}$.

As illustrated on FIG. 6, a shift of amplitude equal to the distance e of the mechanical center X1 relative to the magnetic center C4 creates a magnet sector angle amplitude of an angle α multiply by 2, approximate by a position amplitude of the distance e multiply by 2.

The relation $F_{link}$ is equal to:

$$A_{SH} = TPD \cdot 360 \cdot \frac{C1}{2 \cdot 360 \cdot N_{PP}} \qquad (3)$$

the amplitude $A_{SH}$ and the circumference being in millimetre, and the module TPD being in percentage.

For example, it is assumed that the diameter D is equal to 63 mm.

As the module TPD is equal to 0.2%, the amplitude $A_{SH}$ of the shifting is equal to 0.025 mm.

The shifting vector $\overrightarrow{SH}$ is defined by the amplitude $A_{SH}$ equal to 0.025 mm and the direction $D_{SH}$ equal to 94.45° (−85.55° plus 180°).

Figure 7:
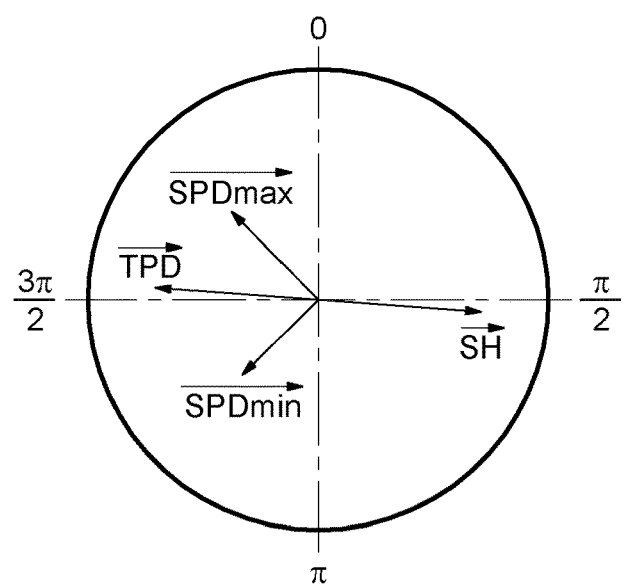
FIG. 7 illustrates a shifting vector.

FIG. 7 represents the first single pitch deviation vector $\overrightarrow{SPDmax}$, the second single pitch deviation vector $\overrightarrow{SPDmin}$, the pitch deviation vector $\overrightarrow{TPD}$ and the shifting vector $\overrightarrow{SH}$.

Then in step 34 (FIG. 3), the impulse ring 7 is locked in the radial direction so that the impulse ring is fixed radially and axially to the inner ring 9 of the bearing 6.

The impulse ring 7 is locked for example by welding, gluing or clinching.

Figure 8:
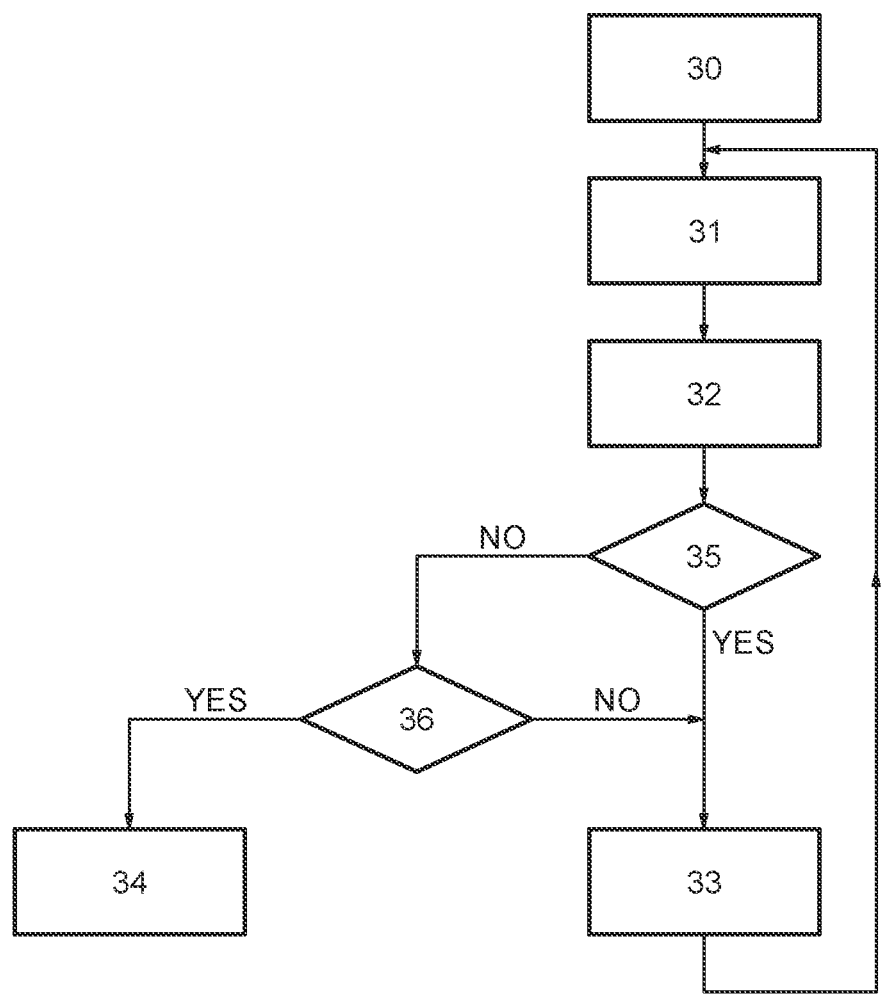
FIG. 8 illustrates a second embodiment of the method for centering the magnetic center of the impulse ring according to the invention.

FIG. 8 represents a second embodiment of the method for centering the magnetic center C4 of the impulse ring 7 on the center of rotation of the bearing 6.

The steps 30, 31 and 32 are executed.

If the steps 30, 31 and 32 are executed for the first time (step 35), then step 33 is executed and then steps 31 and 32 are repeated to determine a new total pitch deviation vector.

When the new total pitch deviation vector is determined, the module of the new total pitch deviation vector is compared to a threshold (step 36). The value of the threshold is for example equal to 0.30%.

If the module of the new total pitch deviation vector is inferior or equal to the threshold, step 34 is executed.

If the module of the new total pitch deviation vector is superior to the threshold, step 33 is executed to determine the shifting vector, the amplitude of the shifting and the direction of the shifting being determined from the new total pitch deviation vector.

The method permits to compensate the misalignment of the different components of the bearing unit 2 by adjusting the impulse ring 7 according to the values of the total pitch deviation vector TPD without improving the accuracy of the bearing unit components so that the magnetic center of the impulse ring and the mechanical center of the bearing unit substantially coincident in order to improve the quality of the detection of the angular position of the rotor.

In the illustrated example, the sensor bearing unit is provided with a rolling bearing comprising one row of rolling elements. Alternatively, the rolling bearing may comprise at least two rows of rolling elements. In the illustrated example, the rolling elements are balls. Alternatively, the rolling bearing may comprise other types of rolling elements, for example rollers. In another variant, the rolling bearing may also be provided with a sliding bearing having no rolling elements.

Otherwise, in this illustrated example, the first ring of the rolling bearing is the inner ring 8 whereas the second ring is the outer ring 9. As an alternative, it could be possible to provide a reversed arrangement with the first ring forming the outer ring and the second ring forming the inner ring. In this case, the impulse ring is secured to the outer ring.

The invention claimed is:

1. A method for centering the magnetic center of an impulse ring of the bearing unit on the center of rotation of a bearing of the bearing unit comprising:
   providing a first ring and a second ring capable of rotating concentrically relative to one another, the impulse ring including a target comprising pairs of magnetic poles and having a fixing sleeve fixed to the first ring of the bearing, the method further comprising:
   a) inserting the impulse ring axially between the first ring and the fixing sleeve, the first ring and the fixing sleeve being configured to maintain the impulse ring in an axial direction of the bearing; a radial gap remaining between the impulse ring and the fixing sleeve,
   b) recording an angular signal over one mechanical turn of the impulse ring, the angular signal being generated by detection means configured to cooperate with the pairs of magnetic poles;
   c) determining a total pitch deviation vector ($\overrightarrow{TPD}$) of the impulse ring based on the angular signal;
   d) shifting the impulse ring in a radial direction of the bearing, the amplitude of the shifting and the direction of the shifting being determined from the total pitch deviation vector, and
   e) securing the impulse ring relative to the first ring.

2. The method according to claim 1, wherein determining a total pitch deviation vector ($\overrightarrow{TPD}$) of the impulse ring comprises:
   determining a single pitch deviation value (SPD) for each interval defined as the angular distance between two nearest magnetic poles of the same polarity;
   selecting the maximal single pitch deviation value and the minimal single pitch deviation value;
   determining a first single pitch deviation vector ($\overrightarrow{SPDmax}$) associated to the maximal single pitch deviation value and a second single pitch deviation vector ($\overrightarrow{SPDmin}$) associated to the minimal single pitch deviation value; and
   calculating the vector difference between the first and the second vectors, the total pitch deviation vector being equal to the resulting vector.

3. The method according to claim 2, wherein determining the single pitch deviation value (SPD) for one interval comprises:
   determining the actual period of the angular signal measured by the detections means over the interval;
   determining a theoretical period of the angular signal over the interval; and
   calculating the single pitch deviation as the difference between the theoretical period of the angular signal and the actual period of the angular signal as a percentage of the theoretical period of the angular signal.

4. The method according to claim 1, wherein the determination of the amplitude and the direction of the shifting comprises:
   determining a relation linking the amplitude of the shifting to the module of the total pitch deviation vector ($\overrightarrow{TPD}$),
   calculating the amplitude with the relation,
   the direction of the shifting being the opposite direction of the total pitch deviation vector.

5. The method according to claim 4, wherein the relation linking the amplitude of the shifting to the module of the total pitch deviation vector is determined mathematically or empirically.

6. The method according to claim 1, wherein when steps a), b), c) and d) are executed; steps b) and c) are repeated to determine a new total pitch deviation vector; and step e) is executed if the module of the new total pitch vector is inferior or equal to a threshold.

7. The method according to claim 1, wherein when steps a), b), c) and d) are executed; steps b) and c) are repeated to determine a new total pitch deviation vector; step d) is repeated if the module of the new total pitch vector is superior to a threshold, the amplitude of the shifting and the direction of the shifting being determined from the new total pitch deviation vector; and step e) is executed when the module of the new total pitch vector is inferior or equal to a threshold.

8. The method according to claim 1, wherein the impulse ring is secured by welding, gluing or clinching.

9. The method according to claim 1, wherein the fixing sleeve is fixed to the inner ring of the bearing.

10. A bearing unit manufactured by providing a first ring and a second ring capable of rotating concentrically relative to one another, an impulse ring including a target comprising pairs of magnetic poles and having a fixing sleeve fixed to the first ring of the bearing, comprising:

the impulse ring axially inserted between the first ring and the fixing sleeve, the first ring and the fixing sleeve being configured to maintain the impulse ring in an axial direction of the bearing; a radial gap remaining between the impulse ring and the fixing sleeve, an angular signal being recorded over one mechanical turn of the impulse ring, the angular signal being generated by detection means configured to cooperate with the pairs of magnetic poles;

a total pitch deviation vector of the impulse ring is determined based on the angular signal;

the impulse ring is shifted in a radial direction of the bearing, the amplitude of the shifting and the direction of the shifting being determined from the total pitch deviation vector, and the impulse ring is secured relative to the first ring.

\* \* \* \* \*